United States Patent
Wu et al.

(10) Patent No.: US 11,239,658 B2
(45) Date of Patent: Feb. 1, 2022

(54) DISPATCHING METHOD AND DEVICE FOR INTEGRATED TRANSMISSION AND DISTRIBUTION NETWORK

(71) Applicant: Tsinghua University, Beijing (CN)

(72) Inventors: Wenchuan Wu, Beijing (CN); Bin Wang, Beijing (CN); Chenhui Lin, Beijing (CN); Boming Zhang, Beijing (CN); Hongbin Sun, Beijing (CN); Qinglai Guo, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 110 days.

(21) Appl. No.: 16/736,313

(22) Filed: Jan. 7, 2020

(65) Prior Publication Data

US 2020/0144819 A1    May 7, 2020

Related U.S. Application Data

(63) Continuation of application No. PCT/CN2018/113461, filed on Nov. 1, 2018.

(30) Foreign Application Priority Data

Oct. 22, 2018   (CN) .......................... 201811227076.2

(51) Int. Cl.
| | |
|---|---|
| *G05D 3/12* | (2006.01) |
| *G05D 5/00* | (2006.01) |
| *G05D 9/00* | (2006.01) |
| *G05D 11/00* | (2006.01) |
| *G05D 17/00* | (2006.01) |
| *H02J 3/00* | (2006.01) |

(52) U.S. Cl.
CPC .......... *H02J 3/00125* (2020.01); *H02J 3/007* (2020.01)

(58) Field of Classification Search
CPC .... H02J 3/00125; H02J 3/007; H02J 2203/20; H02J 2203/10; H02J 3/48; H02J 3/46; Y02E 60/00; Y02E 40/70; Y04S 40/20; Y04S 10/50
USPC ....................................................... 700/297
See application file for complete search history.

(56) References Cited

U.S. PATENT DOCUMENTS

| | | | | |
|---|---|---|---|---|
| 10,361,561 B2* | 7/2019 | Wu | ........................ | G06Q 50/06 |
| 2004/0260489 A1* | 12/2004 | Mansingh | .............. | G06Q 50/06 |
| | | | | 702/60 |

* cited by examiner

*Primary Examiner* — Richard Tan
(74) *Attorney, Agent, or Firm* — Hodgson Russ LLP (57) ABSTRACT

The present disclosure provides a dispatching method and a dispatching device for an integrated transmission and distribution network. The integrated transmission and distribution network include a transmission network and at least one distribution network. The method includes: establishing a dispatch model of the integrated transmission and distribution network; solving the dispatch model to obtain dynamic dispatch parameters for the integrated transmission and distribution network, in which the dynamic dispatch parameters comprise a boundary transferred power from the transmission network to each of the at least one distribution network, and power outputs of all generators in the transmission network and each of the at least one distribution network; and dispatching the integrated transmission and distribution network based on the boundary transferred power and the power outputs of all the generators in the transmission network and each of the at least one distribution network.

16 Claims, 1 Drawing Sheet

DISPATCHING METHOD AND DEVICE FOR INTEGRATED TRANSMISSION AND DISTRIBUTION NETWORK

CROSS-REFERENCE TO RELATED APPLICATION

This application is a continuation of International Application No. PCT/CN2018/113461, filed Nov. 1, 2018, which claims priority to Chinese Patent Application No. 201811227076.2, filed Oct. 22, 2018, the entire disclosure of which is incorporated herein by reference.

FIELD

The present disclosure relates to the field of power system operation and control technology, and more particularly to a dispatching method and a dispatching device for an integrated transmission and distribution network.

BACKGROUND

The development of distributed power sources and active distribution networks has brought many challenges to the operation of the power grid, and coordinated dispatch of the transmission and the distribution networks has become a development trend. Since the transmission network and the distribution network are managed by independent operators, it is difficult to carry out the coordinated dispatch of the transmission and the distribution networks in a centralized manner.

In the related art, the coordinated dynamic dispatch for the transmission and distribution networks require repeated information interaction and iterations between the transmission network and the distribution network, having high dependence on information interaction and communication.

SUMMARY

Embodiments of the present disclosure provide a dispatching method for an integrated transmission and distribution network. The integrated transmission and distribution network include a transmission network and at least one distribution network. The method includes: establishing a dispatch model of the integrated transmission and distribution network, in which the dispatch model includes an objective function and constraints, the objective function is a minimizing function of a total generation cost of the transmission network and the at least one distribution network under the constraints; solving the dispatch model to obtain dynamic dispatch parameters for the integrated transmission and distribution network, in which the dynamic dispatch parameters include a boundary transferred power from the transmission network to each of the at least one distribution network, and power outputs of all generators in the transmission network and each of the at least one distribution network; and dispatching the integrated transmission and distribution network based on the boundary transferred power and the power outputs of all the generators in the transmission network and each of the at least one distribution network. Embodiments of the present disclosure provide a dispatching device for an integrated transmission and distribution network. The integrated transmission and distribution network include a transmission network and at least one distribution network. The device includes a processor; and a memory for storing instructions executable by the processor, in which the processor is configured to perform the above dispatching method for an integrated transmission and distribution network.

Embodiments of the present disclosure provide a non-transitory computer-readable storage medium having stored therein instructions that, when executed by a processor of a computer, causes the computer to perform the above dispatching method for an integrated transmission and distribution network.

It is to be understood that both the foregoing general description and the following detailed description are exemplary and explanatory only and are not restrictive of the invention, as claimed.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

In order to make objectives, technical solutions and advantages of the present disclosure clearer, in the following the present disclosure will be described in detail with reference to drawings. Apparently, the described embodiments are only some embodiments of the present disclosure and do not represent all the embodiments. Based on the embodiment described herein, all the other embodiments obtained by those skilled in the art without creative labor belong to the protection scope of the present disclosure.

Figure 1:
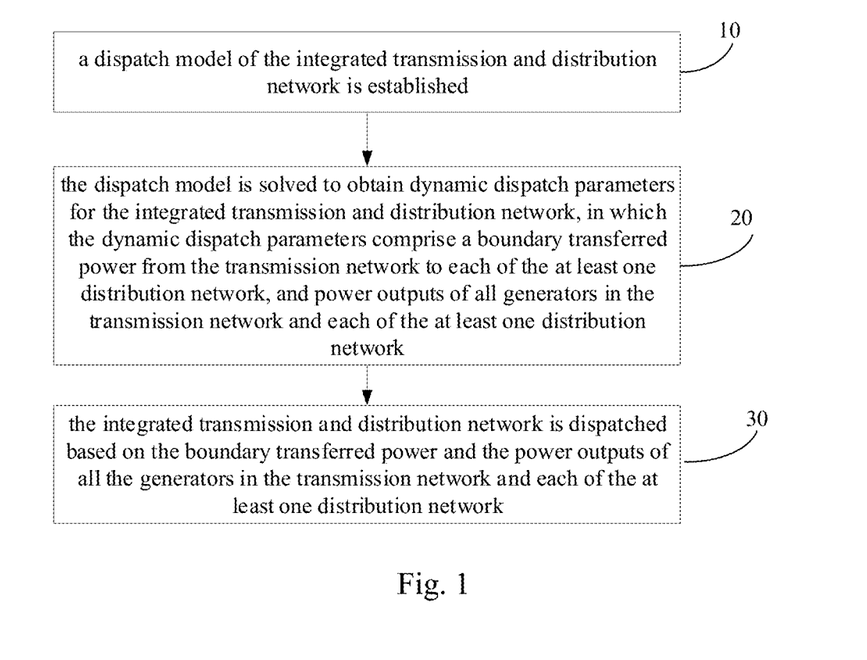
FIG. 1 is a flow chart of a dispatching method for an integrated transmission and distribution network according to an exemplary embodiment of the present disclosure.

FIG. 1 is a flow chart of a dispatching method for an integrated transmission and distribution network according to an exemplary embodiment of the present disclosure. The integrated transmission and distribution network include a transmission network and at least one distribution network. As illustrated in FIG. 1, the method includes followings.

At block 10, a dispatch model of the integrated transmission and distribution network is established. The dispatch model includes an objective function and constraints. The objective function is a minimizing function of a total generation cost of the transmission network and the at least one distribution network under the constraints.

At block 20, the dispatch model is solved to obtain dynamic dispatch parameters for the integrated transmission and distribution network.

In an embodiment, the dynamic dispatch parameters include a boundary transferred power from the transmission network to each of the at least one distribution network, and power outputs of all generators in the transmission network and each of the at least one distribution network.

At block 30, the integrated transmission and distribution network is dispatched based on the boundary transferred power and the power outputs of all the generators in the transmission network and each of the at least one distribution network.

In the following, the method will be described in detail.

The dispatch model of the integrated transmission and distribution network is established. The dispatch model includes the objective function and the constraints. The objective function is a minimizing function of a total generation cost of the transmission network and the at least one distribution network under the constraints.

The objective function of the dispatch model of the integrated transmission and distribution network aims to minimize a total generation cost of the transmission network and the at least one distribution network. The total generation cost of the transmission network and the at least one distribution network is established by a formula of:

$$\sum_{t \in T} \sum_{i \in G^{trans}} C_i^{trans}(pg_{i,t}^{trans}) + \sum_{t \in T} \sum_{k \in DIST} \sum_{i \in G^{trans}} C_i^{dist,k}(pg_{i,t}^{dist,k}) \quad (1)$$

where, T is an index set of dispatch periods, $G^{trans}$ is an index set of generator bus numbers in the transmission network, DIST is an index set of the at least one distribution network, $G^{dist,k}$ is an index set of generator bus numbers in a distribution network k, $C_i^{trans}$ ($pg_{i,t}^{trans}$) is a cost function of a generator at a bus i of the transmission network during a dispatch period t, $pg_{i,t}^{trans}$ is an active power output of the generator at the bus i of the transmission network during the dispatch period t, $C_i^{dist,k}(pg_{i,t}^{dist,k})$ is a cost function of a generator at a bus i of the distribution network k during the dispatch period t, $pg_{i,t}^{dist,k}$ is an active power output of the generator at the bus i of the distribution network k during the dispatch period t.

In some embodiments of the present disclosure, $C_i^{trans}$ ($pg_{i,t}^{trans}$) is expressed as:

$$C_i^{trans}(pg_{i,t}^{trans}) = a_{0,i}^{trans} + a_{1,i}^{trans} pg_{i,t}^{trans} + a_{2,i}^{trans}(pg_{i,t}^{trans})^2 \quad (2),$$

where, $a_{0,i}^{trans}$ is a constant coefficient of generation cost of the generator at the bus i of the transmission network, $a_{1,i}^{trans}$ is a linear coefficient of generation cost of the generator at the bus i of the transmission network, and $a_{2,i}^{trans}$ is a quadratic coefficient of generation cost of the generator at the bus i of the transmission network. $a_{0,i}^{trans}$, $a_{1,i}^{trans}$ and $a_{2,i}^{trans}$ are inherent parameters of the generator.

In some embodiments of the present disclosure, $C_i^{dist,k}$ ($pg_{i,t}^{dist,k}$) is expressed as:

$$C_i^{dist,k}(pg_{i,t}^{dist,k}) = a_{0,i}^{dist,k} + a_{1,i}^{dist,k} pg_{i,t}^{dist,k} + a_{2,i}^{dist,k}(pg_{i,t}^{dist,k})^2 \quad (3),$$

where, $a_{0,i}^{dist,k}$ is a constant coefficient of generation cost of the generator at the bus i of the distribution network k, $a_{1,i}^{dist,k}$ is a linear coefficient of generation cost of the generator at the bus i of the distribution network k, and $a_{2,i}^{dist,k}$ is a quadratic coefficient of generation cost of the generator at the bus i of the distribution network k. $a_{0,i}^{dist,k}$, $a_{1,i}^{dist,k}$ and $a_{2,i}^{dist,k}$ are inherent parameters of the generator.

The constraints include constraints of the transmission network, constraints of the at least one distribution network, and boundary constraints.

The constraints of the transmission network include power balance constraints, constraints of line transmission capacity of the transmission network, spinning reserve constraints, ramping constraints, and active power constraints of generators in the transmission network.

The power balance constraints are denoted by a formula of:

$$\sum_{i \in G^{trans}} pg_{i,t}^{trans} = \sum_{i \in B^{trans}} pb_{i,t}^{trans} + \sum_{i \in D^{trans}} pd_{i,t}^{trans}, \forall t \in T \quad (4)$$

where, $B^{trans}$ is an index set of boundary bus numbers between the transmission network and the at least one distribution network, $pb_{i,t}^{trans}$ is a transferred active power at the bus i of the transmission network to the at least one distribution network during the dispatch period t, $D^{trans}$ is an index set of load bus numbers of the transmission network, $PD_{i,t}^{trans}$ is a load predication value at the bus i during the dispatch period t.

The constraints of line transmission capacity of the transmission network are denoted by a formula of:

$$-PL_n^{trans} \le \sum_{i \in G^{trans}} SF_{n-i}^{trans} pg_{i,t}^{trans} - \quad (5)$$

$$\sum_{i \in B^{trans}} SF_{n-i}^{trans} pb_{i,t}^{trans} - \sum_{i \in D^{trans}} SF_{n-i}^{trans} PD_{i,t}^{trans} \le PL_n^{trans},$$

$$\forall n \in L^{trans}, \forall t \in T$$

where, $PL_n^{trans}$ is an active power flow limit of a line n in the transmission network, $SF_{n-i}^{trans}$ is a shift distribution factor of the bus i on the line n, the shift distribution factor is a topological parameter of the integrated transmission and distribution network and can be directly obtained from a dispatching center of the integrated transmission and distribution network, $L^{trans}$ is an index set of line numbers of the transmission network.

The spinning reserve constraints of the transmission network are denoted by a formula of:

$$0 \le ru_{i,t}^{trans} \le RU_i^{trans} \Delta t, ru_{i,t}^{trans} \le \overline{PG_i^{trans}} - pg_{i,t}^{trans}, \quad (6)$$

$$\forall i \in G^{trans}, \forall t \in T$$

$$0 \le rd_{i,t}^{trans} \le RD_i^{trans} \Delta t, rd_{i,t}^{trans} \le pg_{i,t}^{trans} - \underline{PG_i^{trans}},$$

$$\forall i \in G^{trans}, \forall t \in T$$

$$\sum_{i \in G^{trans}} ru_{i,t}^{trans} \ge SRU_t^{trans}, \sum_{i \in G^{trans}} rd_{i,t}^{trans} \ge SRD_t^{trans}, \forall t \in T$$

where, $ru_{i,t}^{trans}$ is an upward spinning reserve contribution of the generator at the bus i of the transmission network during the dispatch period t, $rd_{i,t}^{trans}$ is a downward spinning reserve contribution of the generator at the bus i of the transmission network during the dispatch period t, $RU_i^{trans}$ is an upward ramp rate of the generator at the bus i of the transmission network during the dispatch period t, $RD_i^{trans}$ is a downward ramp rate of the generator at the bus i of the transmission network during the dispatch period t, $\Delta t$ is a time interval for dispatching, a value of the time interval is determined according to a power dispatching demand, $\overline{PG_i^{trans}}$ is a maximum active power output of the generator at the bus i of the transmission network, $\underline{PG_i^{trans}}$ is a minimum active power output of the generator at the bus i of the transmission network, $SRU_t^{trans}$ is an upward spinning reserve capacity requirement of the transmission network during the dispatch period t, $SRD_t^{trans}$ is a downward spinning reserve capacity requirement of the transmission network during the dispatch period t.

The ramping constraints of the transmission network are denoted by a formula of:

$$-RD_i^{trans} \Delta t \le pg_{i,t+1}^{trans} - pg_{i,t}^{trans} \le RU_i^{trans} \Delta t,$$
$$\forall i \in G^{trans}, \forall t \in T \quad (7).$$

The active power constraints of generators in the transmission network are denoted by a formula of:

$$\underline{PG_i^{trans}} \le pg_{i,t}^{trans} \le \overline{PG_i^{trans}}, \forall i \in G^{trans}, \forall t \in T \quad (8).$$

The constraints of the at least one distribution network include power flow constraints, constraints of line transmission capacity of each distribution network, and active power constraints of generators in each distribution network.

The power flow constraints of the at least one distribution network are denoted by a formula of:

$$\sum_{i:i\to j}\left(p_{i\to j,t}^{dist,k}-l_{i\to j,t}^{dist,k}\right)+p_{j,t}^{dist,k}=\sum_{m:j\to m}p_{j\to m,t}^{dist,k},\ \forall j\in N^{dist,k}, \quad (9)$$

$$\forall t\in T$$

where, $i:i\to j$ is a head node set of branches whose end node is a node j, $$p_{i\to j,t}^{dist,k}$$

is a line flow from a bus i to a bus j in a distribution network k during a dispatch period t, $$l_{i\to j,t}^{dist,k}$$

is a line loss from the bus i to the bus j in the distribution network k during the dispatch period t, $p_{j,t}^{dist,k}$ is an power injection at the bus j in the distribution network k during the dispatch period t, $N^{dist,k}$ is an index set of bus numbers of the distribution network k.

In some embodiments of the present disclosure, $p_{j,t}^{dist,k}$ is obtained according to a formula of:

$$p_{j,t}^{dist,k}=\begin{cases}pg_{j,t}^{dist,k}-PD_{j,t}^{dist,k}+pb_t^{dist,k},\ j\text{ is connected to the }k^{th}\text{ distribution network}\\pg_{j,t}^{dist,k}-PD_{j,t}^{dist,k},\ j\text{ is not connected to the }k^{th}\text{ distribution network}\end{cases},$$

$$\forall j\in N^{dist,k},\ \forall t\in T.$$

where $pg_{j,t}^{dist,k}$ is an active power output of the generator at the bus j of the distribution network k during the dispatch period t, $PD_{j,t}^{dist,k}$ is a load predication value at the bus j of the distribution network k during the dispatch period t, and $pb_t^{dist,k}$ is a transferred active power from the transmission network to the distribution network k during the dispatch period t.

In some embodiments of the present disclosure, $$l_{i\to j,t}^{dist,k}$$

is obtained according to a formula of:

$$l_{i\to j,t}^{dist,k}=\left[(\hat{P}_{i\to j,t}^{dist,k})^2+(\hat{Q}_{i\to j,t}^{dist,k})^2\right]R_{i\to j}^{dist,k}/(\hat{V}_{i,t}^{dist,k})^2+$$

$$2(p_{i\to j,t}^{dist,k}-\hat{P}_{i\to j,t}^{dist,k})\hat{P}_{i\to j,t}^{dist,k}R_{i\to j}^{dist,k}/(\hat{V}_{i,t}^{dist,k})^2,$$

$$\forall(i\to j)\in L^{disk,k},\ \forall t\in T,$$

where, $L^{dist,k}$ is an index set of line numbers of the distribution network k, $$\hat{P}_{i\to j,t}^{dist,k}$$

is operational base points of active power from a bus i to a bus j in a distribution network k during a dispatch period t, $$\hat{Q}_{i\to j,t}^{dist,k}$$

is operational base points of reactive power from the bus i to the bus j in a distribution network k during the dispatch period t, $\hat{V}_{i,t}^{dist,k}$ is an operational base point of voltage magnitude of the bus i during the dispatch period t, in which operation data corresponding to lines with similar history load level is selected as the operational base point, $$R_{i\to j}^{dist,k}$$

is a line resistance from the bus i to the bus j.

The constraints of line transmission capacity of the distribution network are denoted by a formula of:

$$-PL_{i\to j}^{dist,k}\le p_{i\to j,t}^{dist,k}\le PL_{i\to j}^{dist,k},\ \forall(i\to j)\in L^{disk,k},\ \forall t\in T \quad (10)$$

where, $L^{dist,k}$ is an index set of line numbers of the distribution network k, $PL_{i\to j}^{dist,k}$ is an active power limit of line from the bus i to the bus j in the distribution network k.

The active power constraints of generators in the distribution network are denoted by a formula of:

$$\underline{PG}_i^{dist,k}\le pg_{i,t}^{dist,k}\le \overline{PG}_i^{dist,k},\forall i\in G^{dist,k},\forall t\in T \quad (11).$$

The boundary constraints of the integrated transmission and distribution network aims to get a balance between an active power sent from the transmission network and an active power received by the at least one distribution network at each dispatching dispatch period.

The boundary constraints of the integrated transmission and distribution network are denoted by a formula of:

$$pb_{I(k),t}^{trans}=pb_t^{dist,k},\forall k\in\text{DIST},\forall t\in T \quad (12)$$

where, $pb_{i,t}^{trans}$ is a transferred active power at bus i of the transmission network to the at least one distribution network during the dispatch period t, I(k) is the bus number of the transmission network connected to the distribution network k, $pb_t^{dist,k}$ is a transferred active power from the transmission network to the distribution network k during the dispatch period t.

In an embodiment, the dispatch model may be expressed in a matrix form by a formula of:

$$\min C^{trans}(x^{trans}) + \sum_{t \in T}\sum_{k \in DIST} C_t^{dist,k}(x_t^{dist,k}) \quad (13)$$

subject to:

$$x^{trans} \in X^{trans}$$

$$x_t^{dist,k} \in X_t^{dist,k}, \forall k \in DIST, \forall t \in T$$

$$A_t^k x^{trans} + B_t^k x_t^{dist,k} \le c_t^k, \forall k \in DIST, \forall t \in T$$

where, $x^{trans}$ is the vector of transmission network variables, $x_t^{dist,k}$ is the vector of distribution network k variables, $C^{trans}(x^{trans})$ is an objective function of the transmission network, $C_t^{dist,k}(x_t^{dist,k})$ is an objective function of the distribution network k at the dispatch period t, $X^{trans}$ is a constraint set corresponding to the transmission network, $X^{dist,k}$ is a constraint set corresponding to the distribution network k, $A_t^k x^{trans} + B_t^k x_t^{dist,k} \le c_t^k$ is the boundary constraint, $A_t^k$, $B_t^k$, and $c_t^k$ are a coefficient of the transmission network, a coefficient of the distribution network k, and a constant coefficient respectively. The values of two columns corresponding to $pb_{I(k),t}^{trans}$ in $A_t^k$ are 1 and −1, and values of remaining columns in $A_t^k$ are 0, the values of two columns corresponding to $pb_t^{dist,k}$ in $B_t^k$ are −1 and 1, and values of remaining columns in $B_t^k$ are 0, and $c_t^k$ is 0.

In an embodiment, the dispatch model in the matrix form may be solved, which may include the followings.

(3-1) On the distribution network side, the cost function of each distribution network is independently solved.

(3-1-1) The dispatch problem of the distribution network in a single period may be expressed as an optimization problem, which may be expressed by:

$$\min \tfrac{1}{2}(x_t^{dist,k})^T Q_t^k (x_t^{dist,k})$$

subject to: $G_t^k x_t^{dist,k} + h_t^k p_t^{b,k} \le i_t^k$ \quad (14)

where $Q_t^k$ denotes the quadratic matrix of $$\sum_{t \in T}\sum_{k \in DIST}\sum_{i \in G^{dist,k}} C_i^{dist,k}(pg_{i,t}^{dist,k}), G_t^k x_t^{dist,k} + h_t^k p_t^{b,k} \le i_t^k$$

denotes the constraints, $G_t^k$ denotes a coefficient matrix of variables of the distribution network k at the dispatch period t, $h_t^k$ denotes a coefficient matrix of input power variables from the transmission network to the distribution network k at the dispatch period t, $i_t^k$ denotes the constant term in the constraints.

(3-1-2) For each distribution network, a demand range of the power input from the transmission network in each period may be calculated, and a lower bound of the demand range may be expressed as the solution of $p_t^{b,k}$ in the following optimization problem, which is expressed by:

$$\min p_t^{b,k}$$

subject to: $G_t^k x_t^{dist,k} + h_t^k p_t^{b,k} \le i_t^k$ \quad (15)

An upper bound of the demand range may be expressed as the solution of $p_t^{b,k}$ in the following optimization problem, which is expressed by:

$$\max p_t^{b,k}$$

subject to: $G_t^k x_t^{dist,k} + h_t^k p_t^{b,k} \le i_t^k$ \quad (16)

The optimization problems may be solved, and the lower bound $lb_t^{b,k}$ and the upper bound $ub_t^{b,k}$ of the power input from the transmission network to the distribution network in each period may be obtained.

(3-1-3) At initialization, the number of calculations of the cost function in the distribution network is set to 1, i.e., u=1, and a lower bound $\alpha_t^{k,u-1}$ of a sub-interval of the power input from the transmission network to the distribution network k is set to $lb_t^{b,k}$, i.e., $\alpha_t^{k,u-1} = lb_t^{b,k}$.

(3-1-4) A small offset $e=1\times10^{-3}$ is taken, and let $p_t^{b,k} = \alpha_t^{k,u-1} + e$, $p_t^{b,k}$ can be substituted into the above optimization problem, i.e., $p_t^{b,k}$ can be substituted into the formula (14), and the constraints in the optimization problem can be determined. In an embodiment, the active constraints on the solution of $G_t^k x_t^{dist,k} + h_t^k p_t^{b,k} \le i_t^k$ may be expressed as a subscript $(\ )_A$, and the inactive constraints on the solution of $G_t^k x_t^{dist,k} + h_t^k p_t^{b,k} \le i_t^k$ may be expressed as a$(\ )_I$.

(3-1-5) An upper bound $\alpha_t^{k,u}$ of the sub-interval of the power input from the transmission network to the distribution network k can be obtained by solving the following optimization problem, which may be expressed by:

$$\max p_t^{b,k}$$

subject to: $((G_t^k)_A (Q_t^k)^{-1}(G_t^k)_A^T)^{-1}(h_t^k)_A p_t^{b,k} \ge ((G_t^k)_A$
$(Q_t^k)^{-1}(G_t^k)_A^T)^{-1}(i_t^k)_A [(G_t^k)_A (Q_t^k)^{-1}(G_t^k)_A^T((G_t^k)_A$
$(Q_t^k)^{-1}(G_t^k)_A^T)^{-1}(h_t^k)_A - (h_t^k)_I] p_t^{b,k} \ge (G_t^k)_A (Q_t^k)^{-1}$
$(G_t^k)_A^T [(G_t^k)_A (Q_t^k)^{-1}(G_t^k)_A^T]^{-1}(i_t^k)_A - (i_t^k)_I$ \quad (17)

(3-1-6) A local cost function $Q_t^{k,u}$ of the sub-interval of the power input from the transmission network to the distribution network k (the sub-interval $[\alpha_t^{k,u-1}, \alpha_t^{k,u}]$) may be calculated, and the formula of the local cost function $Q_t^{k,u}$ may be expressed as:

$$Q_t^{k,u}(p_t^{b,k}) = \min \tfrac{1}{2}(x_t^{dist,k})^T Q_t^k (x_t^{dist,k}) \quad (18)$$

where $x_t^{dist,k} = -(Q_t^k)^{-1} (G_t^k)_A^T [(G_t^k)_A (Q_t^k)^{-1} (G_t^k)_A^T]^{-1} ((h_t^k)_A p_t^{b,k} - (i_t^k)_A)$.

(3-1-7) The upper bound $\alpha_t^{k,u}$ of the sub-interval $[\alpha_t^{k,u-1}, \alpha_t^{k,u}]$ may be compared with the upper bound $ub_t^{b,k}$ obtained from the formula (16), when $\alpha_t^{k,u} = ub_t^{b,k}$, the sub-interval of the power input from the transmission network and the local cost function of the distribution network in each sub-interval are transmitted to the transmission network, and the step (3-2) are performed. When $\alpha_t^{k,u} < ub_t^{b,k}$, u is increased by 1, and step (3-1-4) is returned.

(3-2) In the following, a dispatch strategy of the transmission network may be calculated based on the sub-interval of the power input from the transmission network to the distribution network in each dispatch period, i.e., the sub-interval calculated in step (3-1).

(3-2-1) At initialization, the number of solution steps v is set to 1, an optimization problem is solved, and an optimal solution of the optimization problem is expressed as $(x_v^{trans}, p_v^b)$, where vector $p_v^b$ is formed by power injection $p_t^{b,k}$ of all distribution networks in each dispatch period, and vector $x_v^{trans}$ corresponds to the value of vector $x^{trans}$ at the optimal solution of the following optimization problem, which may be expressed by:

$$\min C^{trans}(x^{trans}) + \sum_{t \in T}\sum_{k \in DIST} CBL_t^k \quad (19)$$

subject to: $Dx^{trans} + \sum_{t \in T}\sum_{k \in DIST} e_t^k p_t^{b,k} \le f$ $CBL_t^k \ge \delta_t^{k,u} p_t^{b,k} + \varepsilon_t^{k,u}, \forall u = 1, 2, \ldots, n_t^k, \forall t \in T,$ $\forall k \in DIST$ where $CBL_t^k$ is an intermediate variable, and its physical meaning is the local optimal cost of the sub-interval of the distribution network after linearization, $n_t^k$ denotes the number of sub-intervals of the distribution network k at the dispatch period t, $\delta_t^{k,u}$ and $\varepsilon_t^{k,u}$ are defined by:

$$\delta_t^{k,u} = (Q_t^{k,u}(\alpha_t^{k,u}) - Q_t^{k,u}(\alpha_t^{k,u-1}))/(\alpha_t^{k,u} - \alpha_t^{k,u-1}),$$

$$\varepsilon_t^{k,u} = Q_t^{k,u}(\alpha_t^{k,u}) - \delta_t^{k,u}\alpha_t^{k,u}, \forall u = 1, 2, \ldots, n_t^k \quad (20)$$

In the formula (20), $Q_t^{k,u}$ is the local cost function of the distribution network generated in step (3-1-6), $\alpha_t^{k,u}$ is the boundary of the sub-interval of the power input from the transmission network to the distribution network.

(3-2-2) A sub-interval including the optimal solution $(x_v^{trans}, p_v^b)$ may be found from the sub-interval $[\alpha_t^{k,u-1}, \alpha_t^{k,u}]$, and all the sub-intervals including the optimal solution $(x_v^{trans}, p_v^b)$ may be formed a set, denoted as $C_v$.

(3-2-3) An optimal solution $(\hat{x}_v^{trans}, \hat{p}_v^b)$ may be solved by the following formula:

$$\min C^{trans}(x^{trans}) + CB_v(p^b)$$

$$\text{subject to: } Dx^{trans} + Ep^b \le f$$

$$p^b \in C_v \quad (21)$$

where $$Ep^b = \sum_{t \in T} \sum_{k \in DIST} e_t^k p_t^{b,k},$$

$CB_v(p^b)$ is the sum of local cost functions $Q_t^{k,u}$ corresponding to set $C_v$ of each distribution network at each dispatch period.

(3-2-4) The descent direction of the cost function of the transmission and distribution network may be obtained based on the optimal solution $(\hat{x}_v^{trans}, \hat{p}_v^b)$, and the objective function of the cost reduction of the transmission and distribution network according to the declining direction may be obtained, which may be expressed by:

$$\min_{(\Delta x^{trans}, \Delta p^b)} \nabla C^{trans}(\hat{x}_v^{trans}) \square \Delta x^{trans} + \nabla CB_v(\hat{p}_v^b) \square \Delta p^b \quad (22)$$

$$\text{subject to: } D\square(\hat{x}_v^{trans} + \Delta x^{trans}) + E\square(\hat{p}_v^b + \Delta p^b) \le f$$

$$\|\Delta x^{trans}\|_\infty \le e, \|\Delta p^b\|_\infty \le e$$

where $(\Delta x^{trans}, \Delta p^b)$ is the descent direction, $\nabla C^{trans}(\hat{x}_v^{trans})$ is the gradient of the function $C^{trans}$ at $\hat{x}_v^{trans}$, $\nabla CB_v(\hat{p}_v^b)$ is the gradient of the function $CB_v$ at $\hat{p}_v^b$, e is $1 \times 10^{-3}$.

The objective function of the cost reduction of the transmission and distribution network may be determined, when the value of the objective function is greater than or equal to 0, the optimal solution $(\hat{x}^{trans}, \hat{p}^b)$ of the cost of the transmission and distribution network can be obtained, and step (3-3) is performed. When the value of the objective function is less than 0, $(x_{v+1}^{trans}, p_{v+1}^b)$ is calculated by the following formula:

$$(x_{v+1}^{trans}, p_{v+1}^b) = (\hat{x}_v^{trans} + \Delta x_v^{trans}, \hat{p}_v^b + \Delta p_v^b),$$

and number of solution steps v is increased by 1, and step (3-2-2) is returned.

(3-3) $p_t^{b,k}$ of the distribution network in respective dispatch may be obtained from the vector $\hat{p}_v^b$ in the optimal solution $(\hat{x}^{trans}, \hat{p}^b)$, and the model variable $x_t^{dist,k}$ of the distribution network may be calculated by the following formula:

$$\min \tfrac{1}{2}(x_t^{dist,k})^T Q_t^{k,u}(x_t^{dist,k})$$

$$\text{s.t. } G_t^k x_t^{dist,k} + h_t^k p_t^{b,k} \le i_t^k \quad (23)$$

The transmission network and the distribution network may respectively obtain the dispatch plan in the optimal solution $\hat{x}^{trans}$ and $x_t^{dist,k}$ to each power plant, and the dispatch plan is performed by each power plant.

With the technical solutions of the present disclosure, the coordinated dynamic dispatch of the transmission and distribution network is solved in a non-iterative decentralized manner, information security of the transmission network and the distribution network operators can be improved. Moreover, the method according to embodiment of the present disclosure does not require repeated iterations between the transmission network and the distribution network, and the optimal dispatch parameters can be obtained through only two limited information interactions, thereby reducing the dependence on communication and reducing the complexity, having higher execution stability, which is more beneficial to practical applications.

Figure 2:
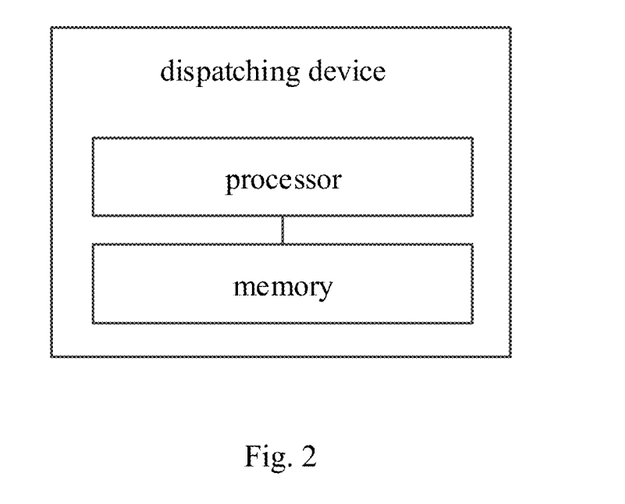
FIG. 2 is a block diagram of a dispatching device for an integrated transmission and distribution network according to an exemplary embodiment of the present disclosure.

To implement the above embodiments, the present disclosure further provides a dispatching device for an integrated transmission and distribution network. FIG. 2 is a block diagram of a dispatching device for an integrated transmission and distribution network according to an exemplary embodiment of the present disclosure. As illustrated in FIG. 2, the dispatching device includes a processor and a memory. The memory is configured to store instructions executable by the processor. When the instructions are executed by the processor, the processor is caused to execute the dispatching method for an integrated transmission and distribution network according to embodiments of the present disclosure.

To implement the above embodiments, the present disclosure further provides a non-transitory computer readable storage medium having computer instructions stored thereon. When the computer instructions are executed by a processor, the processor is caused to execute the speech control method according to embodiments of the present disclosure.

Any process or method described in the flowing diagram or other means may be understood as a module, segment or portion including one or more executable instruction codes of the procedures configured to achieve a certain logic function or process, and the preferred embodiments of the present disclosure include other performances, in which the performance may be achieved in other orders instead of the order shown or discussed, such as in a almost simultaneous way or in an opposite order, which should be appreciated by those having ordinary skills in the art to which embodiments of the present disclosure belong.

The logic and/or procedures indicated in the flowing diagram or described in other means herein, such as a constant sequence table of the executable code for performing a logical function, may be implemented in any computer readable storage medium so as to be adopted by the code execution system, the device or the equipment (such a system based on the computer, a system including a processor or other systems fetching codes from the code execution system, the device and the equipment, and executing the codes) or to be combined with the code execution system, the device or the equipment to be used. With respect to the description of the present invention, "the computer readable storage medium" may include any device including, storing, communicating, propagating or transmitting program so as to be used by the code execution system, the device and the equipment or to be combined with the code execution system, the device or the equipment to be used. The computer readable medium includes specific examples (a non-exhaustive list): the connecting portion (electronic device) having one or more arrangements of wire, the portable computer disc cartridge (a magnetic device), the random access memory (RAM), the read only memory (ROM), the electrically programmable read only memory (EPROMM or the flash memory), the optical fiber device and the compact disk read only memory (CDROM). In addition, the computer readable storage medium even may be papers or other proper medium printed with program, as the papers or the proper medium may be optically scanned, then edited, interpreted or treated in other ways if necessary to obtain the program electronically which may be stored in the computer memory.

Each part of the present disclosure may be implemented by the hardware, software, firmware or the combination thereof. In the above embodiments of the present invention, the plurality of procedures or methods may be implemented by the software or hardware stored in the computer memory and executed by the proper code execution system. For example, if the plurality of procedures or methods is to be implemented by the hardware, like in another embodiment of the present invention, any one of the following known technologies or the combination thereof may be used, such as discrete logic circuits having logic gates for implementing various logic functions upon an application of one or more data signals, application specific integrated circuits having appropriate logic gates, programmable gate arrays (PGA), field programmable gate arrays (FPGA).

It can be understood by those having the ordinary skills in the related art that all or part of the steps in the method of the above embodiments can be implemented by instructing related hardware via programs, the program may be stored in a computer readable storage medium, and the program includes one step or combinations of the steps of the method when the program is executed.

In addition, each functional unit in the present disclosure may be integrated in one progressing module, or each functional unit exists as an independent unit, or two or more functional units may be integrated in one module. The integrated module can be embodied in hardware, or software. If the integrated module is embodied in software and sold or used as an independent product, it can be stored in the computer readable storage medium.

The non-transitory computer-readable storage medium may be, but is not limited to, read-only memories, magnetic disks, or optical disks.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A dispatching method for an integrated transmission and distribution network, wherein the integrated transmission and distribution network comprises a transmission network and at least one distribution network, and the method comprises:

establishing a dispatch model of the integrated transmission and distribution network, wherein the dispatch model comprises an objective function and constraints, the objective function is a minimizing function of a total generation cost of the transmission network and the at least one distribution network under the constraints, wherein the total generation cost of the transmission network and the at least one distribution network is established by a formula of:

$$\sum_{t \in T} \sum_{i \in G^{trans}} C_i^{trans}(pg_{i,t}^{trans}) + \sum_{t \in T} \sum_{k \in DIST} \sum_{i \in G^{dist,k}} C_i^{dist,k}(pg_{i,t}^{dist,k}), \quad (1)$$

where, T is an index set of dispatching, $G^{trans}$ is an index set of generator bus numbers in the transmission network, DIST is an index set of the at least one distribution network, $G^{dist,k}$ is an index set of generator bus numbers in a distribution network k, $C_i^{trans}(pg_{i,t}^{trans})$ is a cost function of a generator at a bus i of the transmission network during a dispatch period t, $pg_{i,t}^{trans}$ is an active power output of the generator at the bus i of the transmission network during the dispatch period t, $C_i^{dist,k}(pg_{i,t}^{dist,k})$ is a cost function of a generator at a bus i of the distribution network k during the dispatch period t, $pg_{i,t}^{dist,k}$ is an active power output of the generator at the bus i of the distribution network k during the dispatch period t;

solving the dispatch model to obtain dynamic dispatch parameters for the integrated transmission and distribution network, wherein the dynamic dispatch parameters comprise a boundary transferred power from the transmission network to each of the at least one distribution network, and power outputs of all generators in the transmission network and each of the at least one distribution network; and dispatching the integrated transmission and distribution network based on the boundary transferred power and the power outputs of all the generators in the transmission network and each of the at least one distribution network, wherein $C_i^{trans}(pg_{i,t}^{trans})$ is expressed as:

$$C_i^{trans}(pg_{i,t}^{trans}) = a_{0,i}^{trans} + a_{1,i}^{trans} pg_{i,t}^{trans} + a_{2,i}^{trans}(pg_{i,t}^{trans})^2 \quad (2),$$

where, $a_{0,i}^{trans}$ is a constant coefficient of generation cost of the generator at the bus i of the transmission network, $a_{1,i}^{trans}$ is a linear coefficient of generation cost of the generator at the bus i of the transmission network, and $a_{2,i}^{trans}$ is a quadratic coefficient of generation cost of the generator at the bus i of the transmission network.

2. The method according to claim 1, wherein $C_i^{dist,k}(pg_{i,t}^{dist,k})$ is expressed as:

$$C_i^{dist,k}(pg_{i,t}^{dist,k}) = a_{0,i}^{dist,k} + a_{1,i}^{dist,k} pg_{i,t}^{dist,k} + a_{2,i}^{dist,k} (pg_{i,t}^{dist,k})^2 \qquad (3),$$

where, $a_{0,i}^{dist,k}$ is a constant coefficient of generation cost of the generator at the bus i of the distribution network k, $a_{1,i}^{dist,k}$ is a linear coefficient of generation cost of the generator at the bus i of the distribution network k, and $a_{2,i}^{dist,k}$ is a quadratic coefficient of generation cost of the generator at the bus i of the distribution network k.

3. The method according to claim 1, wherein the constraints comprise constraints of the transmission network, constraints of the at least one distribution network, and boundary constraints;

the constraints of the transmission network comprise power balance constraints, constraints of line transmission capacity of the transmission network, spinning reserve constraints, ramping constraints, and active power constraints of generators in the transmission network; and the constraints of the at least one distribution network comprise power flow constraints, constraints of line transmission capacity of each distribution network, and active power constraints of generators in each distribution network.

4. The method according to claim 3, wherein the power balance constraints are denoted by a formula of:

$$\sum_{i \in G^{trans}} pg_{i,t}^{trans} = \sum_{i \in B^{trans}} pb_{i,t}^{trans} + \sum_{i \in D^{trans}} PD_{i,t}^{trans}, \forall t \in T, \qquad (4)$$

where, T is an index set of dispatch periods, $G^{trans}$ is an index set of generator bus numbers in the transmission network, $pg_{i,t}^{trans}$ is an active power output of the generator at a bus i of the transmission network during a dispatch period t, $B^{trans}$ is an index set of boundary bus numbers between the transmission network and the at least one distribution network, $pb_{i,t}^{trans}$ is a transferred active power at the bus i of the transmission network to the at least one distribution network during the dispatch period t, $D^{trans}$ is an index set of load bus numbers of the transmission network, $PD_{i,t}^{trans}$ is a load predication value at the bus i during the dispatch period t;

the constraints of line transmission capacity of the transmission network are denoted by a formula of:

$$-PL_n^{trans} \leq \sum_{i \in G^{trans}} SF_{n-i}^{trans} pg_{i,t}^{trans} - $$

$$\sum_{i \in B^{trans}} SF_{n-i}^{trans} pb_{i,t}^{trans} - \sum_{i \in D^{trans}} SF_{n-i}^{trans} PD_{i,t}^{trans} \leq PL_n^{trans}, \qquad (5)$$

$$\forall n \in L^{trans},$$

$$\forall t \in T,$$

where, $PJL_n^{trans}$ is an active power flow limit of a line n in the transmission network, $SF_{n-i}^{trans}$ is a shift distribution factor of the bus i on the line n, the shift distribution factor is a topological parameter of the integrated transmission and distribution network, $L^{trans}$ is an index set of line numbers of the transmission network;

the spinning reserve constraints are denoted by a formula of:

$$0 \leq ru_{i,t}^{trans} \leq RU_i^{trans} \Delta t, ru_{i,t}^{trans} \leq \overline{PG}_i^{trans} - pg_{i,t}^{trans}, \qquad (6)$$

$$\forall i \in G^{trans}, \forall t \in T$$

$$0 \leq rd_{i,t}^{trans} \leq RD_i^{trans} \Delta t, rd_{i,t}^{trans} \leq pg_{i,t}^{trans} - \underline{PG}_i^{trans},$$

$$\forall i \in G^{trans}, \forall t \in T$$

$$\sum_{i \in G^{trans}} ru_{i,t}^{trans} \geq SRU_t^{trans}, \sum_{i \in G^{trans}} rd_{i,t}^{trans} \geq SRD_t^{trans},$$

$$\forall t \in T,$$

where, $ru_{i,t}^{trans}$ is an upward spinning reserve contribution of the generator at the bus i of the transmission network during the dispatch period t, $rd_{i,t}^{trans}$ is a downward spinning reserve contribution of the generator at the bus i of the transmission network during the dispatch period t, $RU_i^{trans}$ is an upward ramp rate of the generator at the bus i of the transmission network during the dispatch period t, $RD_i^{trans}$ is a downward ramp rate of the generator at the bus i of the transmission network during the dispatch period t, $\Delta t$ is a time interval for dispatching, $\overline{PG}_i^{trans}$ is a maximum active power output of the generator at the bus i of the transmission network, $\underline{PG}_i^{trans}$ is a minimum active power output of the generator at the bus i of the transmission network, $SRU_t^{trans}$ is an upward spinning reserve capacity requirement of the transmission network during the dispatch period t, $SRD_t^{trans}$ is a downward spinning reserve capacity requirement of the transmission network during the dispatch period t;

the ramping constraints are denoted by a formula of:

$$-RD_i^{trans} \Delta t \leq pg_{i,t+1}^{trans} - pg_{i,t}^{trans} \leq RU_i^{trans} \Delta t,$$
$$\forall i \in G^{trans}, \forall t \in T \qquad (7); \text{ and}$$

the active power constraints of generators in the transmission network are denoted by a formula of:

$$\underline{PG}_i^{trans} \leq pg_{i,t}^{trans} \leq \overline{PG}_i^{trans}, \forall i \in G^{trans}, \forall t \in T \qquad (8).$$

5. The method according to claim 3, wherein the power flow constraints are denoted by a formula of:

$$\sum_{i:i \to j} \left( p_{i \to j,t}^{dist,k} - l_{i \to j,t}^{dist,k} \right) + p_{j,t}^{dist,k} = \sum_{m:j \to m} p_{j \to m,t}^{dist,k}, \qquad (9)$$

$$\forall j \in N^{dist,k}, \forall t \in T,$$

where, $i:i \to j$ is a head node set of branches whose end node is a node j, T is an index set of dispatch periods, $p_{i \to j,t}^{dist,k}$ is a line flow from a bus i to a bus j in a distribution network k during a dispatch period t, $l_{i \to j,t}^{dist,k}$ is a line loss from the bus i to the bus j in the distribution network k during the dispatch period t, $p_{j,t}^{dist,k}$ is an power injection at the bus j in the distribution network k during the dispatch period t, $N^{dist,k}$ is an index set of bus numbers of the distribution network k;

the constraints of line transmission capacity of the distribution network are denoted by a formula of:

$$-PL_{i \to j}^{dist,k} \leq p_{i \to j,t}^{dist,k} \leq PL_{i \to j}^{dist,k}, \forall (i \to j) \in L^{dist,k}, \forall t \in T, \quad (10)$$

where, $L^{dist,k}$ is an index set of line numbers of the distribution network k, $PL_{i \to j}^{dist,k}$ is an active power limit of line from the bus i to the bus j in the distribution network k; and the active power constraints of generators in the distribution network are denoted by a formula of:

$$\underline{PG_j}^{dist,k} \leq pg_{i,t}^{dist,k} \leq \overline{PG_j}^{dist,k}, \forall i \in G^{dist,k}, \forall t \in T \quad (11).$$

6. The method according to claim 5, wherein $p_{j,t}^{dist,k}$ is obtained according to a formula of:

$$p_{j,t}^{dist,k} = \begin{cases} pg_{j,t}^{dist,k} - PD_{j,t}^{dist,k} + pb_t^{dist,k}, & j \text{ is connected to the } k^{th} \text{ distribution network} \\ pg_{j,t}^{dist,k} - PD_{j,t}^{dist,k}, & j \text{ is not connected to the } k^{th} \text{ distribution network} \end{cases},$$

$\forall j \in N^{dist,k}, \forall t \in T,$ where $pg_{j,t}^{dist,k}$ is an active power output of the generator at the bus j of the distribution network k during the dispatch period t, $PD_{j,t}^{dist,k}$ is a load predication value at the bus j of the distribution network k during the dispatch period t, and $pb_t^{dist,k}$ is a transferred active power from the transmission network to the distribution network k during the dispatch period t.

7. The method according to claim 5, wherein $l_{i \to j,t}^{dist,k}$ is obtained according to a formula of:

$$l_{i \to j,t}^{dist,k} = \left[(\hat{P}_{i \to j,t}^{dist,k})^2 + (\hat{Q}_{i \to j,t}^{dist,k})^2\right] R_{i \to j}^{dist,k} / (\hat{V}_{i,t}^{dist,k})^2 +$$

$$2(p_{i \to j,t}^{dist,k} - \hat{P}_{i \to j,t}^{dist,k}) \hat{P}_{i \to j,t}^{dist,k} R_{i \to j}^{dist,k} / (\hat{V}_{i,t}^{dist,k})^2,$$

$\forall (i \to j) \in L^{dist,k}, \forall t \in T,$ where, $\hat{P}_{i \to j,t}^{dist,k}$ is operational base points or active power from the bus i to the bus j in a distribution network k during a dispatch period t, $\hat{Q}_{i \to j,t}^{dist,k}$ is operational base points of reactive power from the bus i to the bus j in a distribution network k during the dispatch period t, $\hat{V}_{i,t}^{dist,k}$ is an operational base point of voltage magnitude of the bus i during the dispatch period t, $R_{i \to j}^{dist,k}$ is a line resistance from the bus i to the bus j.

8. The method according to claim 3, wherein the boundary constraints are denoted by a formula of:

$$pb_{I(k),t}^{trans} = pb_t^{dist,k}, \forall k \in DIST, \forall t \in T \quad (12),$$

where, T is an index set of dispatch periods, DIST is an index set of the at least one distribution network, $pb_{i,t}^{trans}$ is a transferred active power at a bus i of the transmission network to the at least one distribution network during a dispatch period t, I(k) is a bus in the distribution connected to the distribution network k, $pb_t^{dist,k}$ is a transferred active power from the transmission network to the distribution network k during the dispatch period t.

9. The method according to claim 1, wherein the dispatch model is transformed into a matrix form by a formula of:

$$\min C^{trans}(x^{trans}) + \sum_{t \in T} \sum_{k \in DIST} C_t^{dist,k}(x_t^{dist,k}) \quad (13)$$

subject to:

$x^{trans} \in X^{trans}$ $x_t^{dist,k} \in X_t^{dist,k}, \forall k \in DIST, \forall t \in T$ $A_t^k x^{trans} + B_t^k x_t^{dist,k} \leq c_t^k, \forall k \in DIST, \forall t \in T,$ where, $x^{trans}$ is a vector of transmission network variables, $x_t^{dist,k}$ is a vector of distribution network k variables, $C^{trans}(x^{trans})$ is an objective function of the transmission network, $C_t^{dist,k}(x_t^{dist,k})$ is an objective function of the distribution network k during the dispatch period t, $X^{trans}$ is a constraint set corresponding to the transmission network, $X^{dist,k}$ is a constraint set corresponding to the distribution network k during the dispatch period t, $A_t^k x^{trans} + B_t^k x_t^{dist,k} \leq c_t^k$ is the boundary constraint, $A_t^k$, $B_t^k$, and $c_t^k$ are a coefficient of the transmission network, a coefficient of the distribution network k, and a constant coefficient respectively.

10. A dispatching device for an integrated transmission and distribution network, wherein the integrated transmission and distribution network comprises a transmission network and at least one distribution network, and the device comprises:

a processor; and
a memory, configured to store instructions executable by the processor,
wherein the processor is configured to:
establish a dispatch model of the integrated transmission and distribution network, wherein the dispatch model comprises an objective function and constraints, the objective function is a minimizing function of a total generation cost of the transmission network and the at least one distribution network under the constraints, wherein the total generation cost of the transmission network and the at least one distribution network is established by a formula of:

$$\sum_{t \in T} \sum_{i \in G^{trans}} C_i^{trans}(pg_{i,t}^{trans}) + \sum_{t \in T} \sum_{k \in DIST} \sum_{i \in G^{dist,k}} C_i^{dist,k}(pg_{i,t}^{dist,k}), \quad (1)$$

where, T is an index set of dispatch periods, $G^{trans}$ is an index set of generator bus numbers in the transmission network, DIST is an index set of the at least one distribution network, $G^{dist,k}$ is an index set of generator bus numbers in a distribution network k, $C_i^{trans}(pg_{i,t}^{trans})$ is a cost function of a generator at a bus i of the transmission network during a dispatch period t, $pg_{i,t}^{trans}$ is an active power output of the generator at the bus i of the transmission network during the dispatch period t, $C_i^{dist,k}(pg_{i,t}^{dist,k})$ is a cost function of a generator at a bus i of the distribution network k during the dispatch period t, $pg_{i,t}^{dist,k}$ is an active power output of the generator at the bus i of the distribution network k during the dispatch period t;

solve the dispatch model to obtain dynamic dispatch parameters for the integrated transmission and distribution network, wherein the dynamic dispatch parameters comprise a boundary transferred power from the transmission network to each of the at least one distribution network, and power outputs of all generators in the transmission network and each of the at least one distribution network; and dispatch the integrated transmission and distribution network based on the boundary transferred power and the power outputs of all the generators in the transmission network and each of the at least one distribution network, wherein $C_i^{trans}(pg_{i,t}^{trans})$ is expressed as:

$$C_i^{trans}(pg_{i,t}^{trans}) = a_{0,i}^{trans} + a_{1,i}^{trans} pg_{i,t}^{trans} + a_{2,i}^{trans}(pg_{i,t}^{trans})^2 \quad (2)$$

where, $a_{0,i}^{trans}$ is a constant coefficient of generation cost of the generator at the bus i of the transmission network, $a_{1,i}^{trans}$ is a linear coefficient of generation cost of the generator at the bus i of the transmission network, and $a_{2,i}^{trans}$ is a quadratic coefficient of generation cost of the generator at the bus i of the transmission network.

11. The device according to claim 10, wherein $C_i^{dist,k}(pg_{i,t}^{dist,k})$ is expressed as:

$$C_i^{dist,k}(pg_{i,t}^{dist,k}) = a_{0,i}^{dist,k} + a_{1,i}^{dist,k} pg_{i,t}^{dist,k} + a_{2,i}^{dist,k}(pg_{i,t}^{dist,k})^2 \quad (3),$$

where, $a_{0,i}^{dist,k}$ is a constant coefficient of generation cost of the generator at the bus i of the distribution network k, $a_{1,i}^{dist,k}$ is a linear coefficient of generation cost of the generator at the bus i of the distribution network k, and $a_{2,i}^{dist,k}$ is a quadratic coefficient of generation cost of the generator at the bus i of the distribution network k.

12. The device according to claim 10, wherein the constraints comprise constraints of the transmission network, constraints of the at least one distribution network, and boundary constraints;

the constraints of the transmission network comprise power balance constraints, constraints of line transmission capacity of the transmission network, spinning reserve constraints, ramping constraints, and active power constraints of generators in the transmission network; and the constraints of the at least one distribution network comprise power flow constraints, constraints of line transmission capacity of each distribution network, and active power constraints of generators in each distribution network.

13. The device according to claim 12, wherein the power balance constraints are denoted by a formula of:

$$\sum_{i \in G^{trans}} pg_{i,t}^{trans} = \sum_{i \in B^{trans}} pb_{i,t}^{trans} + \sum_{i \in D^{trans}} PD_{i,t}^{trans}, \forall t \in T, \quad (4)$$

where, T is an index set of dispatch periods, $G^{trans}$ is an index set of generator bus numbers in the transmission network, $pg_{i,t}^{trans}$ is an active power output of the generator at a bus i of the transmission network during a dispatch period t, $B^{trans}$ is an index set of boundary bus numbers between the transmission network and the at least one distribution network, $pb_{i,t}^{trans}$ is a transferred active power at the bus i of the transmission network to the at least one distribution network during the dispatch period t, $D^{trans}$ is an index set of load bus numbers of the transmission network, $PD_{i,t}^{trans}$ is a load predication value at the bus i during the dispatch period t;

the constraints of line transmission capacity of the transmission network are denoted by a formula of:

$$-PL_n^{trans} \leq \sum_{i \in G^{trans}} SF_{n-i}^{trans} pg_{i,t}^{trans} - \quad (5)$$
$$\sum_{i \in B^{trans}} SF_{n-i}^{trans} pb_{i,t}^{trans} - \sum_{i \in D^{trans}} SF_{n-i}^{trans} PD_{i,t}^{trans} \leq PL_n^{trans},$$
$$\forall n \in L^{trans}, \forall t \in T,$$

where, $PL_n^{trans}$ is an active power flow limit of a line n in the transmission network, $SF_{n-i}^{trans}$ is a shift distribution factor of the bus i on the line n, the shift distribution factor is a topological parameter of the integrated transmission and distribution network, $L^{trans}$ is an index set of line numbers of the transmission network;

the spinning reserve constraints are denoted by a formula of:

$$0 \leq ru_{i,t}^{trans} \leq RU_i^{trans}\Delta t, ru_{i,t}^{trans} \leq \overline{PG_i^{trans}} - pg_{i,t}^{trans}, \quad (6)$$
$$\forall i \in G^{trans}, \forall t \in T$$
$$0 \leq rd_{i,t}^{trans} \leq RD_i^{trans}\Delta t, rd_{i,t}^{trans} \leq pg_{i,t}^{trans} - \underline{PG_i^{trans}},$$
$$\forall i \in G^{trans}, \forall t \in T$$
$$\sum_{i \in G^{trans}} ru_{i,t}^{trans} \geq SRU_t^{trans}, \sum_{i \in G^{trans}} rd_{i,t}^{trans} \geq SRD_t^{trans}, \forall t \in T,$$

where, $ru_{i,t}^{trans}$ is an upward spinning reserve contribution of the generator at the bus i of the transmission network during the dispatch period t, $rd_{i,t}^{trans}$ is a downward spinning reserve contribution of the generator at the bus i of the transmission network during the dispatch period t, $RU_i^{trans}$ is an upward ramp rate of the generator at the bus i of the transmission network during the dispatch period t, $RD_i^{trans}$ is a downward ramp rate of the generator at the bus i of the transmission network during the dispatch period t, $\Delta t$ is a time interval for dispatching, $\overline{PG}_i^{trans}$ is a maximum active power output of the generator at the bus i of the transmission network, $\underline{PG}_i^{trans}$ is a minimum active power output of the generator at the bus i of the transmission network, $SRU_t^{trans}$ is an upward spinning reserve capacity requirement of the transmission network during the dispatch period t, $SRD_t^{trans}$ is a downward spinning reserve capacity requirement of the transmission network during the dispatch period t;

the ramping constraints are denoted by a formula of:

$$-RD_i^{trans} \Delta t \leq pg_{i,t+1}^{trans} - pg_{i,t}^{trans} \leq RU_i^{trans} \Delta t, \quad \forall i \in G^{trans}, \forall t \in T \qquad (7); \text{ and}$$

the active power constraints of generators in the transmission network are denoted by a formula of:

$$\underline{PG}_i^{trans} \leq pg_{i,t}^{trans} \leq \overline{PG}_i^{trans}, \forall i \in G^{trans}, \forall t \in T \qquad (8).$$

14. The device according to claim 12, wherein the power flow constraints are denoted by a formula of:

$$\sum_{i:i \to j} \left( p_{i \to j,t}^{dist,k} - l_{i \to j,t}^{dist,k} \right) + p_{j,t}^{dist,k} = \sum_{m:j \to m} p_{j \to m,t}^{dist,k}, \qquad (9)$$

$$\forall j \in N^{dist,k}, \forall t \in T,$$

where, i:i→j is a head node set of branches whose end node is a node j, T is an index set of dispatch periods, $p_{i \to j,t}^{dist,k}$ is a line flow from a bus i to a bus j in a distribution network k during a dispatch period t, $l_{i \to j,t}^{dist,k}$ is a line loss from the bus i to the bus j in the distribution network k during the dispatch period t, $p_{j,t}^{dist,k}$ is an power injection at the bus j in the distribution network k during the dispatch period t, $N^{dist,k}$ is an index set of bus numbers of the distribution network k;

the constraints of line transmission capacity of the distribution network are denoted by a formula of:

$$-PL_{i \to j}^{dist,k} \leq p_{i \to j,t}^{dist,k} \leq PL_{i \to j}^{dist,k}, \forall (i \to j) \in L^{dist,k}, \quad \forall t \in T \qquad (10),$$

where, $L^{dist,k}$ is an index set of line numbers of the distribution network k, $PL_{i \to j}^{dist,k}$ is an active power limit of line from the bus i to the bus j in the distribution network k; and the active power constraints of generators in the distribution network are denoted by a formula of:

$$\underline{PG}_i^{dist,k} \leq pg_{i,t}^{dist,k} \leq \overline{PG}_i^{dist,k}, \forall i \in G^{dist,k}, \forall t \in T \qquad (11).$$

15. The device according to claim 14, wherein $p_{j,t}^{dist,k}$ is obtained according to a formula of:

$$p_{j,t}^{dist,k} = \begin{cases} pg_{j,t}^{dist,k} - PD_{j,t}^{dist,k} + pb_t^{dist,k}, & j \text{ is connected to the } k^{th} \text{ distribution network} \\ pg_{j,t}^{dist,k} - PD_{j,t}^{dist,k}, & j \text{ is not connected to the } k^{th} \text{ distribution network} \end{cases},$$

$$\forall j \in N^{dist,k}, \forall t \in T,$$

where $pg_{j,t}^{dist,k}$ is an active power output of the generator at the bus j of the distribution network k during the dispatch period t, $PD_{j,t}^{dist,k}$ is a load predication value at the bus j of the distribution network k during the dispatch period t, and $pb_t^{dist,k}$ is a transferred active power from the transmission network to the distribution network k during the dispatch period t.

16. A non-transitory computer-readable storage medium having stored therein instructions that, when executed by a processor of a computer, causes the computer to perform a dispatching method for an integrated transmission and distribution network, wherein the integrated transmission and distribution network comprises a transmission network and at least one distribution network, the method comprises:

establishing a dispatch model of the integrated transmission and distribution network, wherein the dispatch model comprises an objective function and constraints, the objective function is a minimizing function of a total generation cost of the transmission network and the at least one distribution network under the constraints, wherein the total generation cost of the transmission network and the at least one distribution network is established by a formula of:

$$\sum_{t \in T} \sum_{i \in G^{trans}} C_i^{trans}(pg_{i,t}^{trans}) + \sum_{t \in T} \sum_{k \in DIST} \sum_{i \in G^{dist,k}} C_i^{dist,k}(pg_{i,t}^{dist,k}), \qquad (1)$$

where, T is an index set of dispatch periods, $G^{trans}$ is an index set of generator bus numbers in the transmission network, DIST is an index set of the at least one distribution network, $G^{dist,k}$ is an index set of generator bus numbers in a distribution network k, $C_i^{trans}(pg_{i,t}^{trans})$ is a cost function of a generator at a bus i of the transmission network during a dispatch period t, $pg_{i,t}^{trans}$ is an active power output of the generator at the bus i of the transmission network during the dispatch period t, $C_i^{dist,k}(pg_{i,t}^{dist,k})$ is a cost function of a generator at a bus i of the distribution network k during the dispatch period t, $pg_{i,t}^{dist,k}$ is an active power output of the generator at the bus i of the distribution network k during the dispatch period t;

solving the dispatch model to obtain dynamic dispatch parameters for the integrated transmission and distribution network, wherein the dynamic dispatch parameters comprise a boundary transferred power from the transmission network to each of the at least one distribution network, and power outputs of all generators in the transmission network and each of the at least one distribution network; and dispatching the integrated transmission and distribution network based on the boundary transferred power and the power outputs of all the generators in the transmission network and each of the at least one distribution network, wherein $C_i^{trans}(pg_{i,t}^{trans})$ is expressed as:

$$C_i^{trans}(pg_{i,t}^{trans}) = a_{0,i}^{trans} + a_{1,i}^{trans} pg_{i,t}^{trans} + a_{2,i}^{trans} (pg_{i,t}^{trans})^2 \qquad (2),$$

where, $a_{0,i}^{trans}$ is a constant coefficient of generation cost of the generator at the bus i of the transmission network, $a_{1,i}^{trans}$ is a linear coefficient of generation cost of the generator at the bus i of the transmission network, and $a_{2,i}^{trans}$ is a quadratic coefficient of generation cost of the generator at the bus i of the transmission network.

* * * * *